(12) United States Patent
Komine et al.

(10) Patent No.: US 6,399,918 B1
(45) Date of Patent: Jun. 4, 2002

(54) METHOD AND APPARATUS FOR BONDING BRAKE SHOE AND LINING

(75) Inventors: Haruo Komine; Akira Nishimura, both of Hachioji (JP)

(73) Assignee: Japan Brake Industrial Co., Ltd., Hachioji (JP)

( * ) Notice: Subject to any disclaimer, the term of this patent is extended or adjusted under 35 U.S.C. 154(b) by 0 days.

(21) Appl. No.: 09/486,826

(22) PCT Filed: Sep. 7, 1998

(86) PCT No.: PCT/JP98/03999

§ 371 (c)(1), (2), (4) Date: Mar. 3, 2000

(87) PCT Pub. No.: WO99/12737

PCT Pub. Date: Mar. 18, 1999

(30) Foreign Application Priority Data

Sep. 8, 1997 (JP) ................................. 9-242648

(51) Int. Cl.[7] ........................... B23B 31/20; F16D 69/04
(52) U.S. Cl. .................. 219/243; 219/521; 156/583.1; 156/272.2; 156/380.9; 100/301; 100/295
(58) Field of Search ............................. 219/243, 521, 219/385, 535; 156/583.1, 583.91, 228, 272.2, 273.7, 275.7, 380.9, 580, 583.2, 583.4, 499; 100/301, 300, 320–321, 305, 326, 295

(56) References Cited

U.S. PATENT DOCUMENTS

| | | | | |
|---|---|---|---|---|
| 2,269,758 A | * | 1/1942 | Noronha | 156/583.1 |
| 2,489,496 A | * | 11/1949 | O'Brien | 100/301 |
| 2,494,281 A | * | 1/1950 | Batchelor et al. | 100/301 |
| 2,559,748 A | * | 7/1951 | Batchelor et al. | 100/301 |
| 2,569,737 A | * | 10/1951 | Spanich | 100/301 |
| 2,598,363 A | * | 5/1952 | Davis | 100/301 |
| 2,649,132 A | * | 8/1953 | Barrett | 100/301 |
| 2,655,974 A | * | 10/1953 | Heintz, Jr. | 100/301 |
| 2,684,775 A | * | 7/1954 | Von Hofe | 156/583.1 |
| 2,726,974 A | * | 12/1955 | Lupton et al. | 100/301 |
| 2,730,161 A | * | 1/1956 | Langer | 156/583.2 |
| 2,745,463 A | * | 5/1956 | Rempel | 156/583.2 |
| 3,891,825 A | * | 6/1975 | Pritchard | 219/243 |
| 4,169,007 A | | 9/1979 | Pray | |
| 4,416,716 A | | 11/1983 | Horiuchi | |
| 4,668,850 A | | 5/1987 | Matsuda et al. | |
| 5,522,954 A | | 6/1996 | Bennett et al. | |

FOREIGN PATENT DOCUMENTS

| | | |
|---|---|---|
| DE | 19532230 | 3/1997 |
| FR | 2581929 | 11/1986 |
| JP | 60-203493 | 10/1985 |
| JP | 60-222228 | 11/1985 |
| JP | 61-153026 | 7/1986 |
| JP | 8-337761 | * 12/1996 |
| JP | 8-337762 | * 12/1996 |
| JP | 9-48953 | 2/1997 |
| JP | 9-144793 | 6/1997 |

* cited by examiner

Primary Examiner—John A. Jeffery
(74) Attorney, Agent, or Firm—Antonelli, Terry, Stout & Kraus, LLP

(57) ABSTRACT

A thermal bonding method wherein at least two members are thermally bonded to each other with an adhesive by pressing and heating a laminate formed by laminating at least two members on each other with the adhesive interposed therebetween, comprising placing at least one member of the laminate close to a heated radiation heater and pressing the laminate in a radiation heat-applied state; and an apparatus comprising a radiation heater, a supporting member for supporting the laminate with at least one member of the laminate placed close to the radiation heater, and a pressing unit adapted to approach, contact and press the laminate supported by the supporting member and then move away from the laminate to stop applying a pressure to the same.

20 Claims, 8 Drawing Sheets

METHOD AND APPARATUS FOR BONDING BRAKE SHOE AND LINING

TECHNICAL FIELD

The invention relates to a thermal bonding method and an apparatus for the method. Particularly, it relates to a thermal bonding method and an apparatus for bonding two members laminated with an adhesive interposed therebetween by heating and pressing, which enable uniform and efficient heating and continuously bonding plural sets of members, and are therefore excellent in bonding accuracy and cost.

BACKGROUND ART

Conventionally, bonding two members with an adhesive has been performed by a thermal bonding method wherein two members are laminated with an adhesive interposed therebetween into one body which is then pressed with a jig and passed through a tunnel-like heating furnace while being pressing continuously to thermally melt or thermally cure the adhesive in the heating furnace.

For example, in production of brake shoe assemblies for drum brakes, bonding brake shoe bodies and friction linings with adhesives has been performed by coating a brake shoe body and a friction lining with a thermosetting adhesive, drying, setting them in a pressing jig, and then heating in a thermally curing furnace with hot blast to cure the thermosetting adhesive.

However, thermally curing thermosetting adhesives with hot blast involves the problems that quick curing is difficult due to the low heat transfer, and that it cannot heat the parts coated with adhesives efficiently, because other parts, such as jigs, transfer instruments and the walls of the furnace, are also inevitably heated. To solve such problems and achieve downsizing of equipment and quicker heating, the use of high-frequency induction heating is proposed in Japanese Patent Application Non-examined Publication No. 61-153026. The method enables quicker heating, but is poor in heating efficiency because it is an indirect heating using an eddy current. Another shortcoming is that the method needs coils and equipment of complicated structures to uniformly heat brake shoe bodies of complicated shapes.

In Japanese Patent Application Non-examined Publication No. 9-48953 disclosed is another bonding method wherein while pressure is being applied, one of the members to be bonded is placed in contact with a heated holder to heat it by heat conduction from the holder. In this method, bonding with heat and pressure is performed quickly and efficiently. However, in cases where the surface of the member to be bonded by the method is coated with a coating, such as a primer for coating the surfaces of brake shoes, there arises problems in that the coating transfers to the holder during thermal curing and is peeled off from the product.

In Japanese Patent Application Non-examined Publication No. 9-144793 disclosed is another method of bonding a brake shoe body with a friction lining by laminating them with an adhesive interposed therebetween and then bonding with heat and pressure, wherein the heat for bonding is generated by the brake shoe body itself by electrically charging the brake shoe body through electrodes pressed to both ends of the brake shoe body. However, to heat the brake shoe uniformly by this method, complicated control is required, for example, cooling the electrodes and the parts not bearing the friction lining, or adjusting the pressure to the electrodes to prevent partial overheat due to contact resistance. Further, adhesives generate gas during cure with heat, and, in this method wherein only the electrically charged brake shoe body generates heat, the gas is cooled and condensed, adhering to the electrodes or jigs. In addition, the method efficiently reduces the heating time, but necessitates preparation of many apparatuses since the complicated heating system permits only one laminate to be bonded by one apparatus.

DISCLOSURE OF INVENTION

The object of the invention is to provide a thermal bonding method and an apparatus for the method which enable quick and thermally efficient bonding with heat and pressure using adhesive, such as bonding shoe rims of brake shoe bodies with friction linings, prevent peeling of surface coating, and enable continuous production of plural bonding products using simple instrument.

After study to solve the above-described problems, the inventors have accomplished the invention based on the finding that the problems can be solved by using radiant heat as the heat for bonding with heat and pressure.

Accordingly, the invention provides a thermal bonding method for bonding at least two members to each other with an adhesive by pressing and heating a laminate formed by laminating the members on each other with the adhesive interposed therebetween, comprising placing at least one member of the laminate close to a heated radiation heater and pressing the laminate in a radiant heat-applied state.

The method of the invention does not need adjustment of pressure nor partial cooling for temperature control, and the simplified heating procedure reduces the production cost. It also prevents peeling of the coating on laminates, because the laminate is not heated by heat conduction but by radiant heat requiring no contact with heaters. Further, since radiant heat also gives a high temperature atmosphere, the gas generating from the adhesive on curing does not condense to adhere to the apparatus. In addition, since the method of the invention is feasible with apparatuses of simple structures, apparatuses for simultaneous bonding of plural laminates can be constructed easily, thereby improving the production efficiency.

The invention also provides an apparatus for bonding at least two members to each other with an adhesive by pressing and heating a laminate comprising the two members and the adhesive interposed between the two members, which apparatus comprises a radiation heater, a supporting member for supporting the laminate with at least one member placed close to the radiation heater, and a pressing unit adapted to approach, contact and press the laminate supported on the supporting member and then move away from the laminate to stop applying a pressure to the laminate.

BEST MODE FOR CARRYING OUT THE INVENTION

Figure 1:
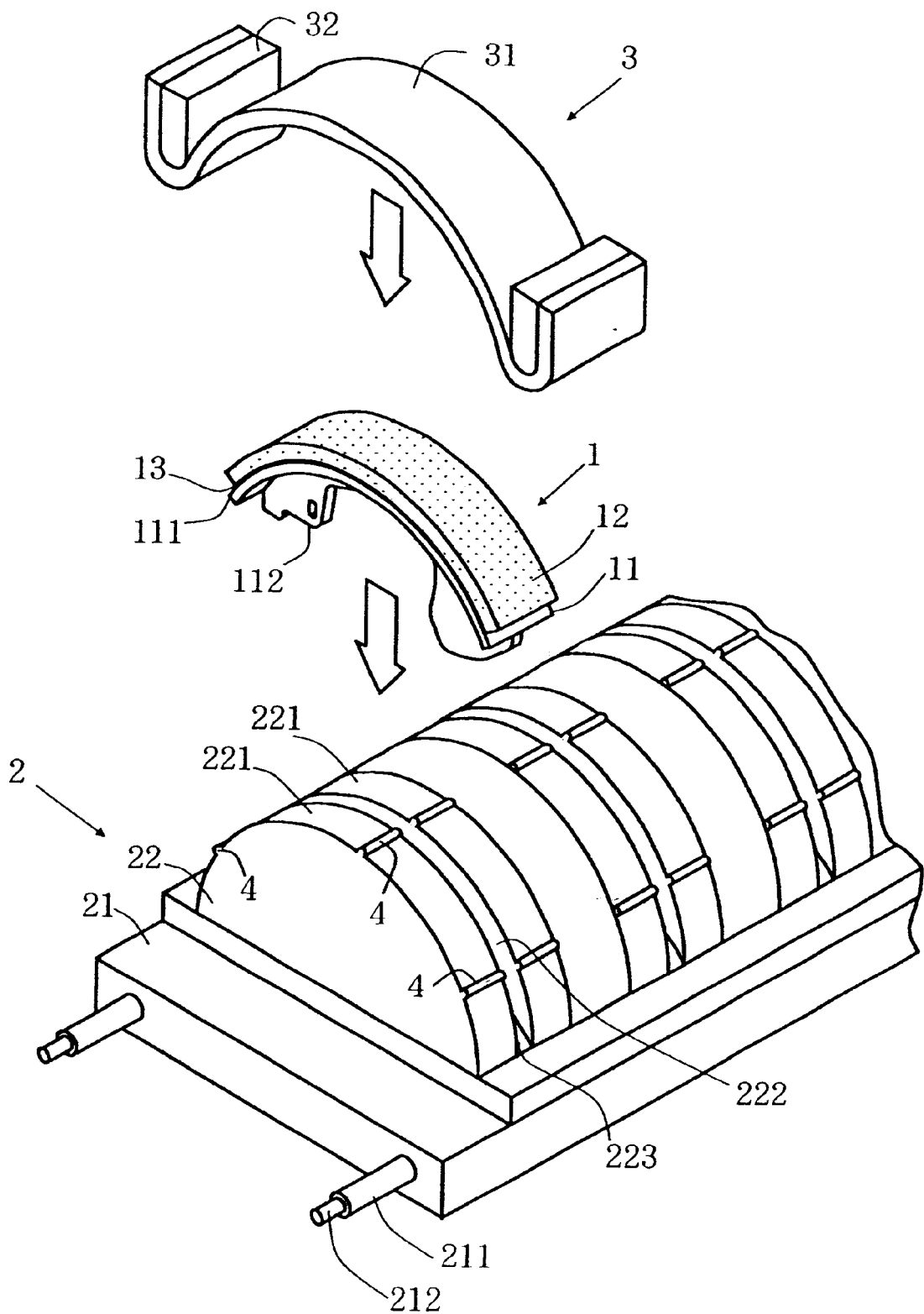
FIG. 1 is a perspective view illustrating a method and an apparatus of an embodiment according to the invention.

The structure and material of the radiation heater to be used in the thermal bonding method and apparatus of the invention may be of any structure and any material so far as it can be brought close to at least one member of the laminate and can emit radiant heat and transfer it to the member uniformly. Typical examples are heaters which have a housing formed of metal of high thermal conductivity, such as iron, steel, aluminum, stainless steel, aluminum alloy, brass or copper, for example, an aluminum-cast heater, an induction heating plate, a heater housing a cartridge heater and a far-infrared heater. It is also possible to heat a thermal medium charged in a housing, or to electrically charge a metal capable of generating heat by using a slip ring so that the metal itself generates heat. Also the shape of the radiant heater is not particularly limited so far as at least one member of the laminate can be brought close to the radiant heater, and may be properly designed depending on the shape of the laminate. The surface of the radiation heater is preferably coated with a black coating to improve radiation efficiency.

Further, the radiation heater may comprise a heater and a laminate holder, wherein the laminate holder is in contact with the heater and emits the heat transferred from the heater by conduction. In this embodiment, at least one member of the laminate is supported close to the laminate holder, and heated by a radiant heat emitted from the laminate holder heated by the heater through heat conduction. Examples of heaters suited to this embodiment include the above-described heater having metal housing, and the heater that emits the heat generated by heating a thermal medium charged in a housing. This method reduces the production cost because the heater itself needn't be constructed into a complicated shape to adapt it to the laminate. It also improves the production efficiency since plural laminates can be bonded at a time by easily mounting plural laminate holders in contact with one heater.

The shape of the laminate holder is not particularly limited as far as at least one member of the laminate can be placed close to the laminate holder, and may be designed properly depending on the shape of the laminate. The material of the laminate holder is not particularly limited so far as it can be heated by the heater through heat conduction, and generally preferred is a metal, such as iron, steel, stainless steel, aluminum or aluminum alloy. The surface of the laminate holder is preferably coated with a black coating to improve the radiation efficiency.

The method of supporting the laminate close to the radiation heater (or the laminate holder of the radiation heater) is not particularly limited. For example, the face of the radiation heater (or of the laminate holder of the radiation heater) to be brought close to the laminate may have parts coming in contact with the laminate to support it, for example, projections formed on the face. In such an embodiment, it is necessary to minimize the contact area between the radiation heater (or the laminate holder of the radiation heater) and the laminate to heat at least one member of the laminate uniformly and to prevent the transfer of the coating on the laminate, and the laminate is preferably supported by point-contact or line-contact. To prevent the coating on the brake shoe body from transferring to the projections, the projections may be coated with a releasable heat resistant polymer.

Examples of the releasable heat resistant polymer for coating the surface of the shoe rim supporter include silicone rubbers, silicone resins, fluororubbers and fluorocarbon resins.

Examples of silicone rubbers include those produced from an organopolysiloxane, such as dimethylpolysiloxane raw rubber, methylphenylpolysiloxane raw rubber, methylvinylpolysiloxane raw rubber, cyano, alkylmethylpolysiloxane rubber or fluoroalkyl, methyl, polysiloxane raw rubber, by vulcanizing it with a vulcanizing agent, such as an organic peroxide. These may be compounded with an inorganic filler, such as silica powder, silica aerogel, calcined diatomaceous silica, calcined kaolin, calcium carbonate, iron oxide powder, zirconium silicate powder, titanium oxide powder or zinc oxide powder. Additives, such as zirconyl nitrate, metal zirconates, zirconium silicate, carbon black or Teflon powder, may also be added.

Examples of silicone resins include methylsilicone resin, phenylmethylsilicone resin, alkyd-modified silicone resin and melamine-modified silicone resin. Additives, such as aluminum powder for improving heat resistance, may be added thereto.

Examples of fluororubbers include copolymers of trifluorochloroethylene and vinylidene fluoride and copolymers of hexafluoropropylene and vinylidene fluoride.

Examples of fluorocarbon resins include polytetrafluoroethylene (Teflon), polytrifluorochloroethylene, copolymers of tetrafluoroethylene and hexafluoropropylene, and polymers and copolymers of vinyl fluoride, vinylidene fluoride and dichlorodifluoroethylene.

The thickness of the coating of such releasable heat resistant polymers is not particularly limited, and the preferred thickness depends on the kinds of the releasable heat resistant polymers. In cases of silicone rubbers and fluororubbers, it is preferably 200 to 700 $\mu$m, more preferably 300 to 500 $\mu$m. In cases of silicone resins and fluorocarbon resins, it is preferably 10 to 100 $\mu$m, more preferably 20 to 50 $\mu$m.

The projection on the surface of the radiation heater (or the surface of the laminate holder of the radiation heater) may also be formed by making a hole in the radiation heater, and inserting therein a pin which partially protrudes from the opening of the hole. Projections formed on the metal surface of the radiation heater by molding or the like may wear readily. Forming projections by inserting pins in the holes made in the radiation heater facilitates exchange of worn pins. The wear of projections and the number of pin-exchanges may be reduced by using pins of hard materials, such as quenched steel. Pins having coating of the above-described releasable heat resistant polymers may also be used. The shapes of the hole and pin are not particular limited as far as a projection of a uniform height protrudes from the opening of the hole on pressing.

When at least one member of the laminate is placed close to the radiation heater, the gap between the laminate and the radiation heater facing each other is preferably made as narrow as possible, for example, 0.1 to 0.4 mm, preferably 0.2 to 0.4 mm.

For efficient heating by the radiant heat emitted by the radiation heater, the laminate to be bonded by thermal bonding preferably has a metal member as the member to be placed close to the radiation heater. The adhesive is not particularly limited, and may be selected from various adhesives, such as solvent-vaporizing adhesives, thermosetting adhesives and hot melt adhesives, depending on the materials of the members and the uses of the bonded products.

As a thermal bonding and an apparatus of an embodiment according to the invention, a method and an apparatus for producing a brake shoe assembly for drum brakes of vehicles will be explained hereinafter. The brake shoe for drum brakes is generally produced by bonding a friction lining to a metallic brake shoe body with an adhesive. The brake shoe body generally comprises a shoe rim of an arcuate band form bent lengthwise and a shoe rib protruding radially inwardly from the radially inner face of the shoe rim. The friction lining generally has a uniform thickness, and is laminated on the radially outer face of the shoe rim of the brake shoe body with an adhesive interposed therebetween, and heated and pressed to bond.

Figure 2:
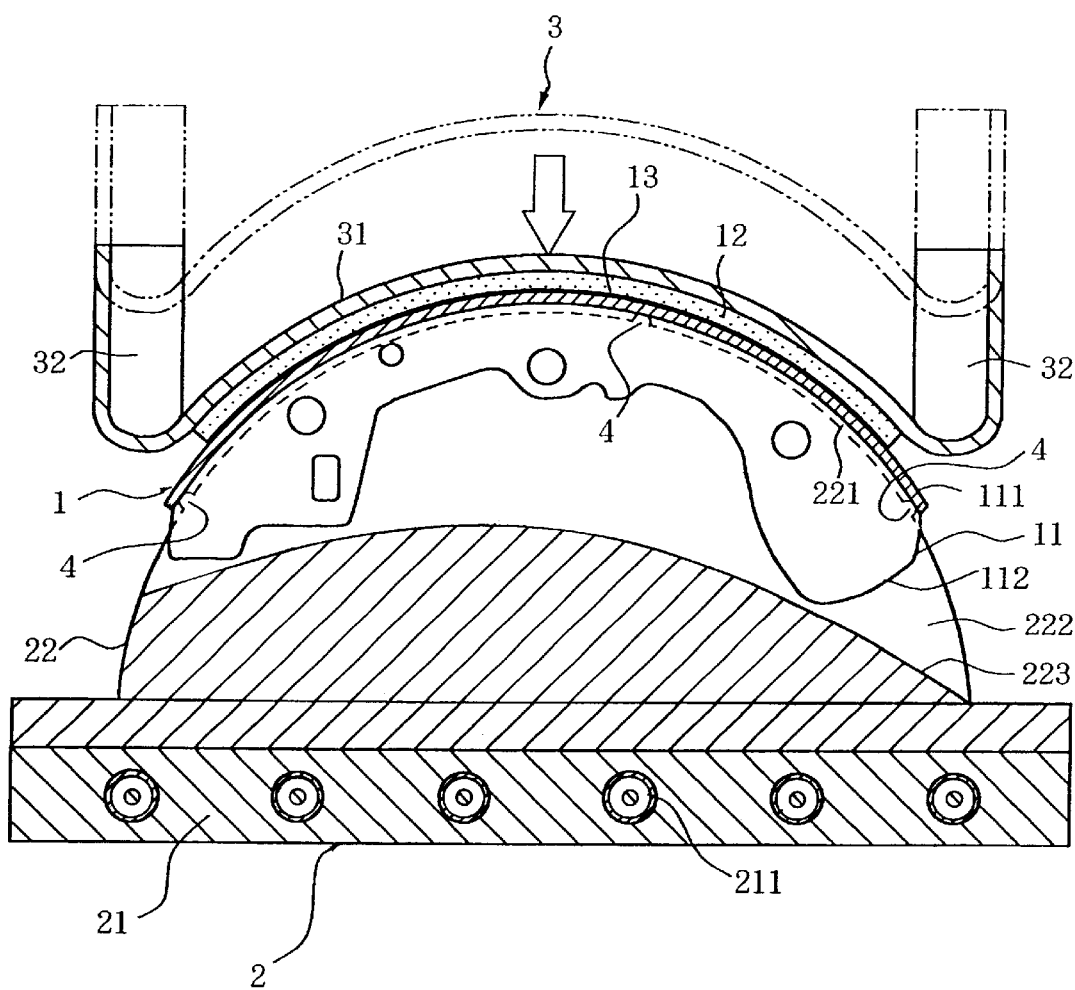
FIG. 2 is a cross-section illustrating a laminate being thermally bonded by the method and apparatus as shown in FIG. 1.

FIG. 1 is a partially perspective view illustrating a thermal bonding method and an apparatus of an embodiment according to the invention. FIG. 2 is a cross-section of the thermal bonding method and apparatus of FIG. 1. In this embodiment, one member of the laminate 1 is the brake shoe body 11, and another member is the friction lining 12 that is laminated on the radially outer face of the shoe rim 111 of the brake shoe body 11 with the adhesive 13 interposed therebetween.

The brake shoe body 11 has the shoe rim 111 of an arcuate band form bent lengthwise and the shoe rib 112 that extends in a direction of the length of the shoe rim 111 along the center of the width of the shoe rim 111 and protrudes radially inwardly from the circular arc.

The brake shoe body 11 is formed of a metal, preferably an SPC steel sheet-pile, and other metals, such as aluminum or an aluminum alloy, may also be used.

The brake shoe body may be coated with a coating, such as a primer. Primer coating on brake shoe bodies is for rust prevention and corrosion protection, and examples of primers are resins commonly used as adhesives. For example, a solution of an adhesive, such as a phenol resin adhesive or an epoxy resin adhesive, dissolved in a solvent, such as methanol, methyl ethyl ketone or toluene, is applied to the brake shoe body and then dried by removing the solvent with heat, to form a primer coating on the surface of the brake shoe body.

The friction lining 12 forms the friction surface of the brake shoe assembly, and is made of nonmetallic materials. For example, the friction lining 12 to be used in the invention may be made by mixing short fibers, such as asbestos short fibers or glass fibers, with a binder thermosetting resin, and forming the mixture into a bent sheet with pressure and heat.

The adhesive 13 is applied to the radially outer face of the shoe rim 111 of the brake shoe body 11 and to the radially inner face of the friction lining 12, and dried with hot blast. The shoe rim 111 and the friction lining 12 are then laminated with the adhesive 13 interposed therebetween, to form the laminate 1. The adhesive 13 is generally a thermosetting adhesive, and preferred examples are phenolic resin thermosetting adhesives and epoxy resin thermosetting adhesives, which are particularly resistive to impact, bending and peeling.

Figure 3:
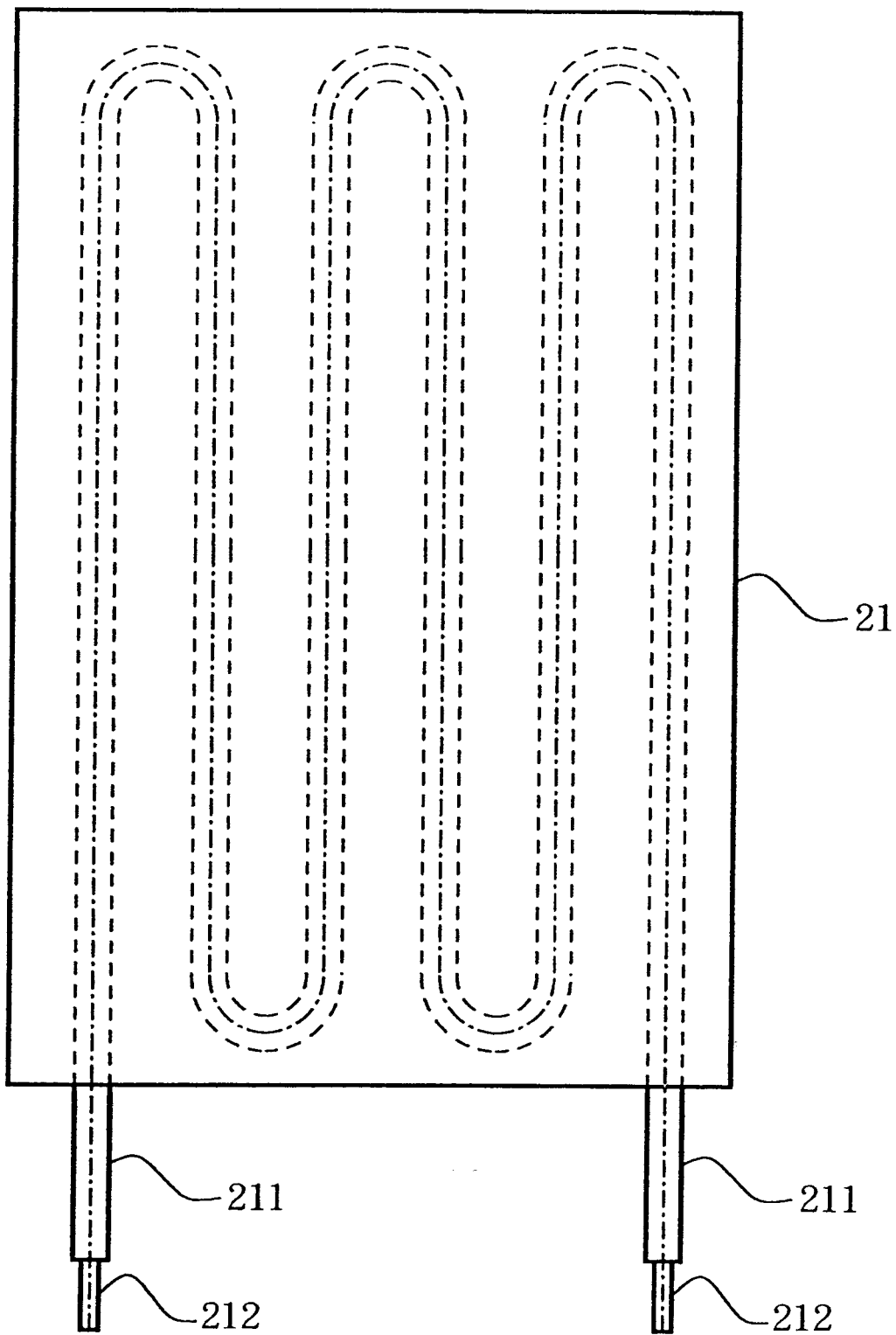
FIG. 3 is a plan view of the heater in the apparatus of FIG. 1.

In the apparatus as shown in FIGS. 1 and 2, the radiation heater 2 comprises the plate-like heater 21 and the plural laminate holders 22 that are mounted on the heater 21 with their bases in contact with the heater 21. As shown in FIG. 3, in the heater 21 of this embodiment, the SUS-cartridge heater 211 is assembled in cast aluminum and has terminals 212. Each laminate holder 22 has the bent face 221 capable of being covered by the radially inner face of the shoe rim 111, the narrow groove 222 for receiving the shoe rib 112 without contacting the shoe rib 112 with the laminate holder 22, and a supporting member which is a shoe rim supporter comprising six projections 4 formed on the bent face 221. Each groove 222 is wider than the thickness of the shoe rib 112.

The degree of the curve of the bent face 221 may be such that the bent face 221 is received by the shoe rim 111 close to the radially inner face. In the apparatus as shown in FIGS. 1 and 2, circular arc of the bent face 221 has a smaller radius than that of the radially inner face of the shoe rim 111, and the tops of the projections 4 of the same height contact the radially inner face of the shoe rim 111 to support the laminate 1.

Although the shoe rim supporter in the apparatus as shown in FIGS. 1 and 2 comprises six linear projections 4, the number of the projections are not limited, and the linear projections may be replaced by one or more projections for point-contact, such as hemispherical projections.

FIG. 2 shows the shoe rib 112 is inserted in the narrow groove 222 of the laminate holder 22 without contacting the inner walls of the groove, and the shoe rim supporter comprising the six projection 4 is in line-contact with the radially inner face of the shoe rim 111 to support the laminate 1. In FIGS. 1 and 2, although the base 223 of the narrow groove 222 is bent as close to the base of the shoe rib 112 as possible, it may be flat or may be grooved completely to the base of the laminate holder 22 since the shoe rib is generally thin and can be uniformly heated by radiation to the sides.

The pressing unit 3 has a pressing band 31, such as a band of a spring material, having a bent face capable of fitting with the surface of the friction lining 12 of the laminate 1, and a pressing band holder 32 supporting the pressing band 31. Both ends of the pressing band 31 are supported by the pressing band holder 32, and the remaining pressing part between both ends has spring-elasticity. The pressing unit 3 may be of one body which makes one combination with all of the plural laminate holders 22, or may be of plural bodies which make combinations with the plural laminate holders respectively. Although one pressing unit 3 is shown over only one laminate holder 22 in FIGS. 1 and 2, one pressing unit 3 is arranged over each laminate holder 22.

Figure 4:
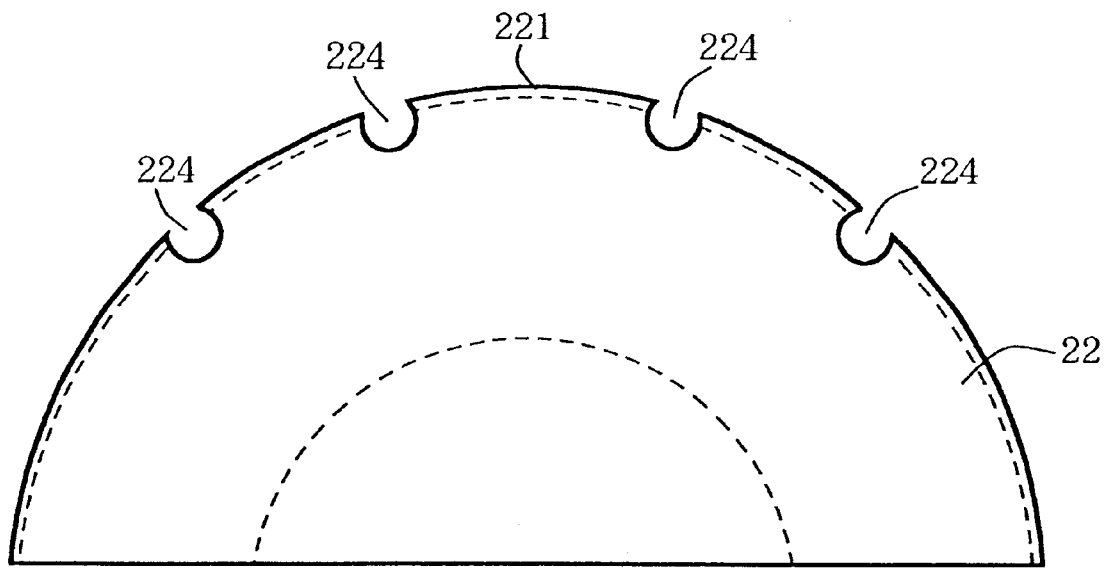
FIG. 4 is a partially elevational view of a laminate holder of an apparatus of an embodiment according to the invention.
Figure 5:
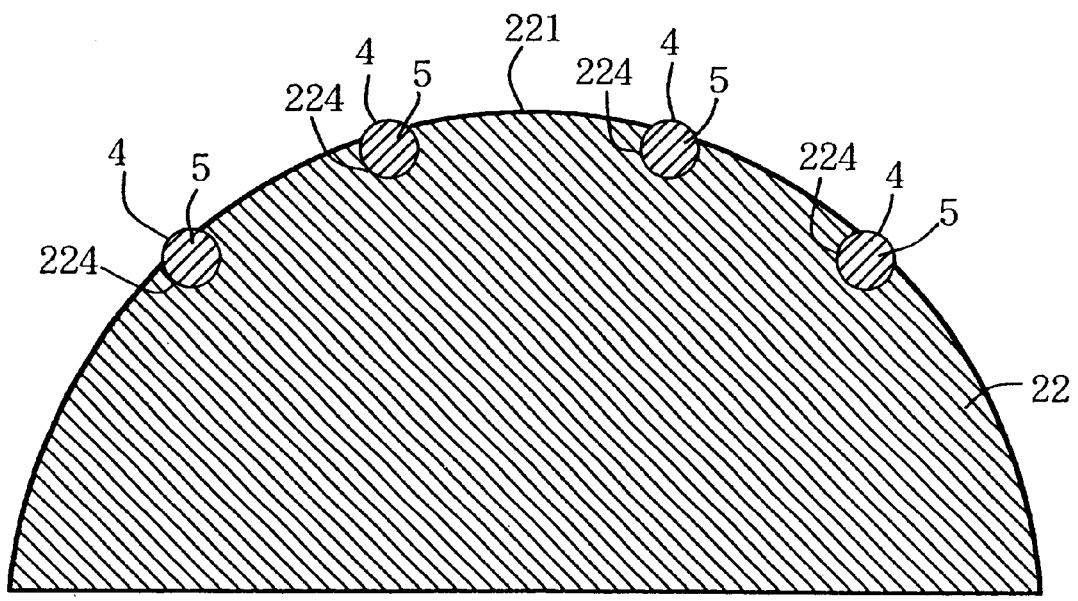
FIG. 5 is a partial cross-section of a laminate holder of an apparatus of an embodiment according to the invention.
Figure 6:
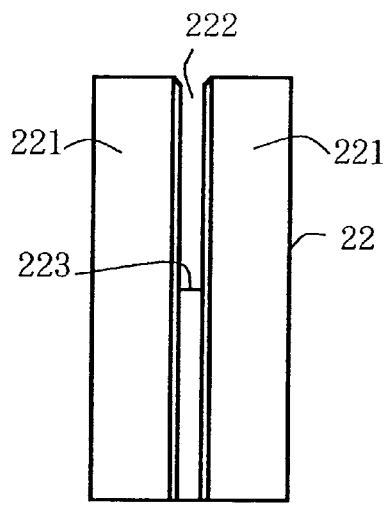
FIG. 6 is a partial side view of the laminate holder of FIG. 4 and FIG. 5 which is not yet be machined to make holes.
Figure 7:
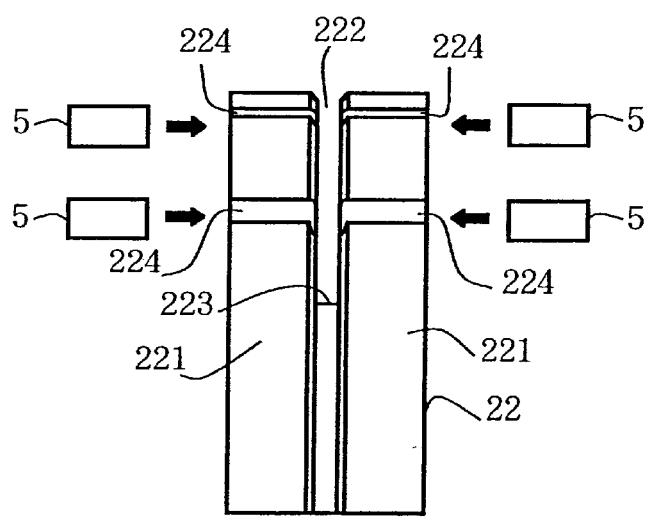
FIG. 7 is a partial side view illustrating the laminate holder of FIG. 5 being fabricated.
Figure 8:
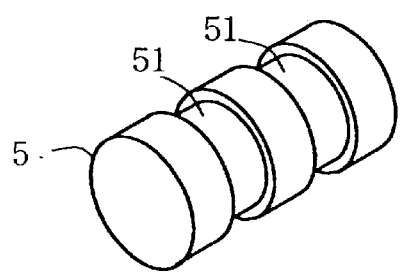
FIG. 8 is a perspective view of a pin of an example usable for the laminate holder of FIG. 5.

FIG. 4 is a partially elevational view of another embodiment of the laminate holder usable in the apparatus of FIGS. 1 and 2. In the bent face 221 of the laminate holder 22 are made plural holes 224 having the major arc cross-section and extending perpendicular to the bending direction. As shown in FIG. 5, the cylindrical pins 5 having a circular cross-section of the same radius as that of the major arc cross-section of the holes 224 are inserted in the holes 224. The pins 5 partially protrude from the openings of the holes 224, to form projections 4. FIG. 6 shows a partial side view of the laminate holder 22 before making holes, FIG. 7 illustrates pins 5 being inserted in the holes 224 made in the bent face 221 of the laminate holder 22. Making slits 51 in the surface of the pins 5 as shown in FIG. 8 further reduces the contact area between the projections and the shoe rim.

Figure 9:
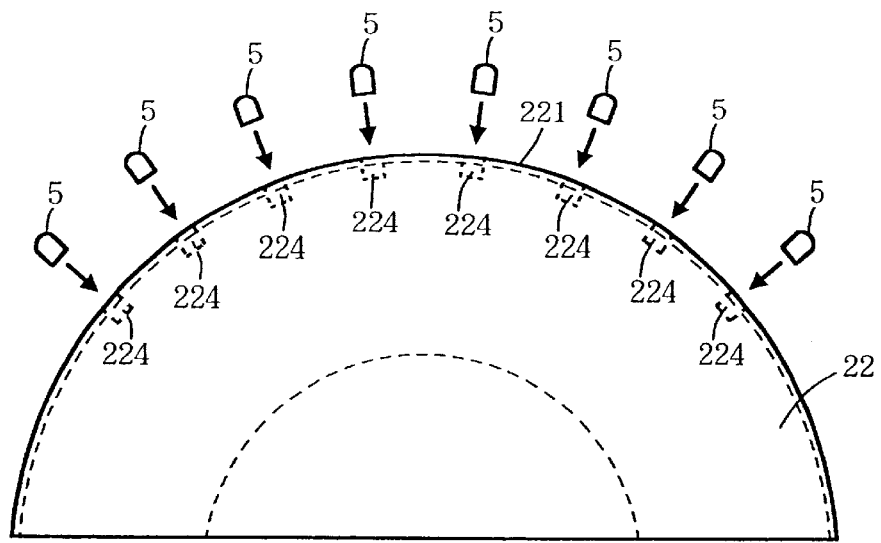
FIG. 9 is a partially elevational view of a laminate holder in an apparatus of an embodiment according to the invention.
Figure 10:
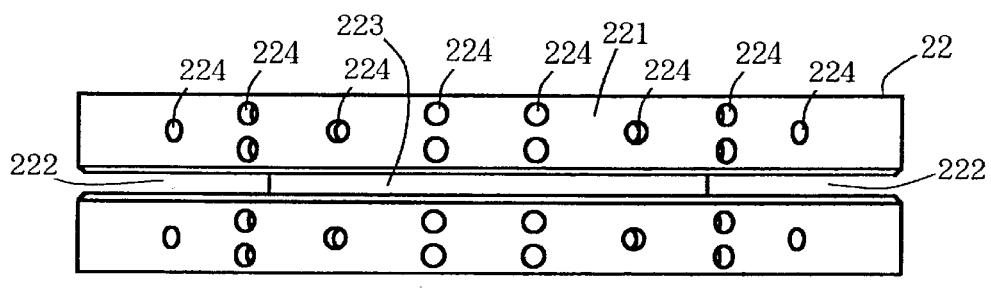
FIG. 10 is a partial top view of the laminate holder of FIG. 9.
Figure 11:
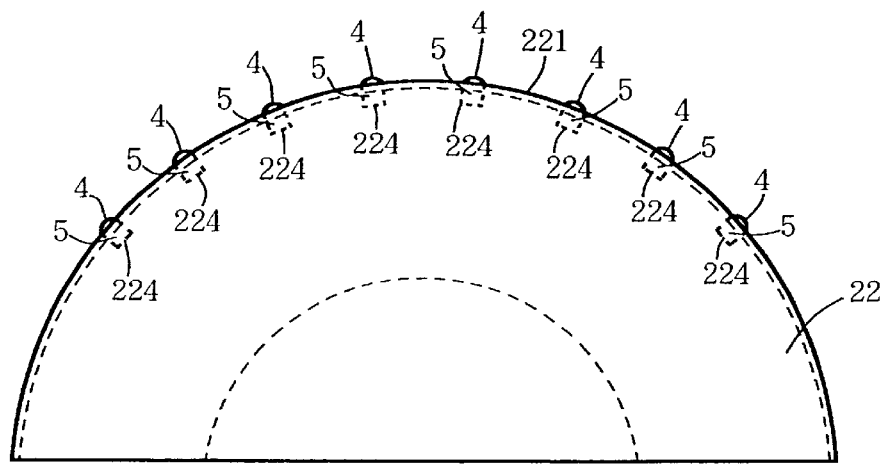
FIG. 11 is a partially elevational view of the laminate holder of FIG. 9 having projections made by inserting pins in holes.

FIG. 9 is a partially elevational view of the laminate holder 22 having plural holes 224 each having a circular opening in the bent face 221 and extending into the laminate holder 22, and FIG. 10 is a partial top view of the laminate holder 22. The cylindrical pins 5 each with an end spherically machined are inserted in the holes 224 through the openings in the bent face 221 in the directions of the arrows. As shown in FIG. 11, the pins 5 partially protrude from the holes 224 to form projections 4. The pins are preferably detachable to facilitate exchanging worn pins.

Figure 12:
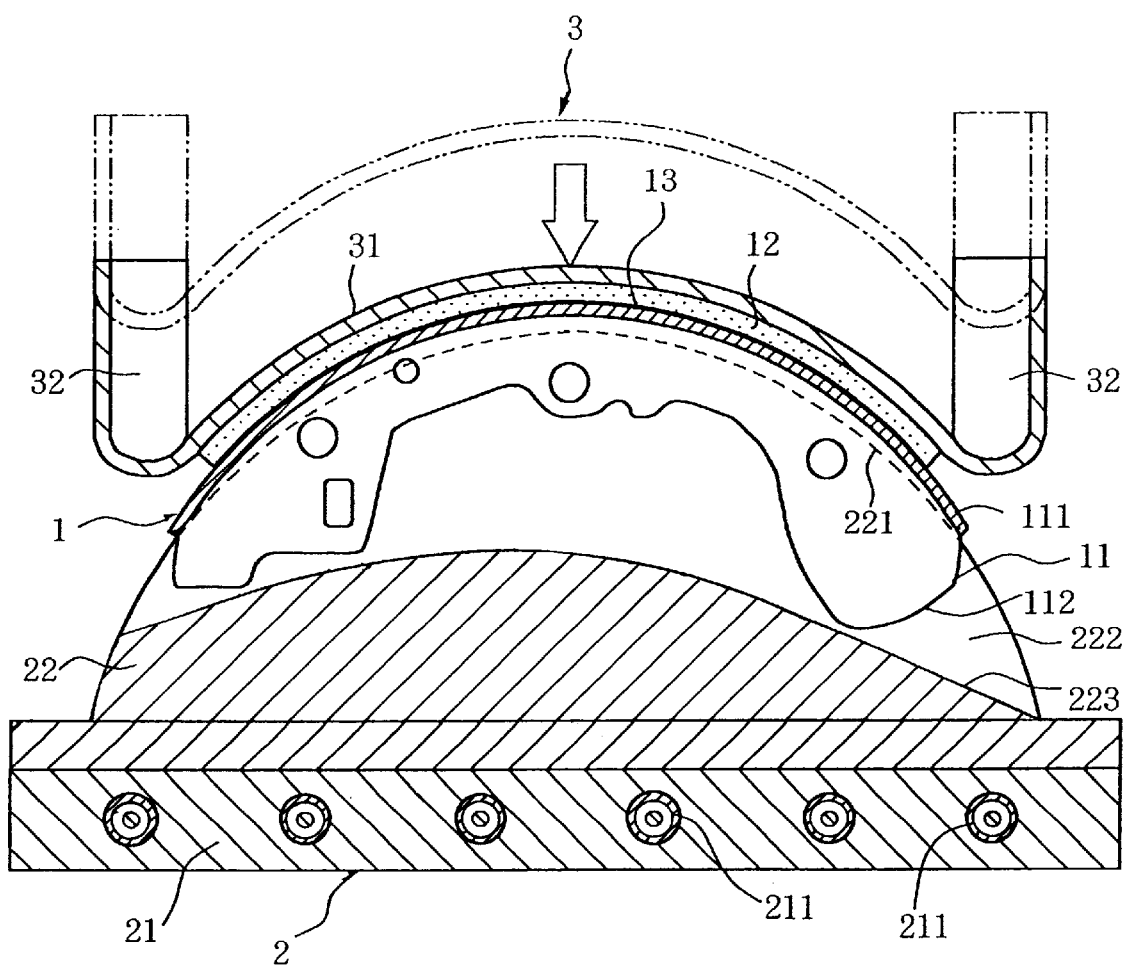
FIG. 12 is a cross-section illustrating a method and an apparatus of another embodiment according to the invention.

FIG. 12 is a cross-section of a supporting member of another embodiment usable in the apparatus of FIGS. 1 and 2. The bent face 221 of the laminate holder 22 of this embodiment has a radius larger than that of the radially inner face of the shoe rim 111. Having a radius larger than that of the shoe rim 111, the bent face 221 linearly contacts with only both ends of the shoe rim 111 to support the whole laminate 1. That is, in this embodiment, the bent face 221 of the laminate holder 22 itself partially works as the supporting member.

Figure 13:
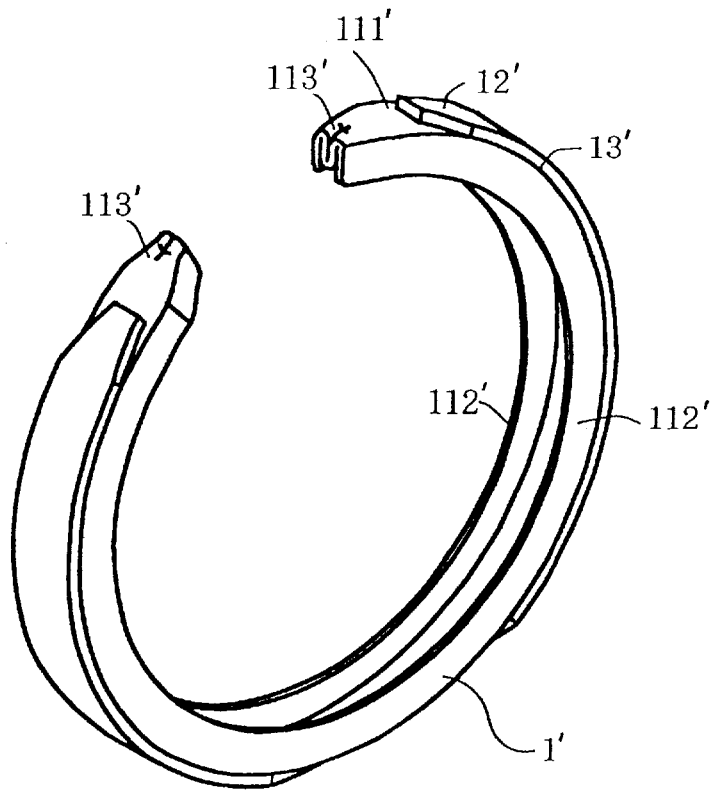
FIG. 13 is a perspective view of a laminate of an example used in the method of the invention.

FIG. 13 is a perspective view of another embodiment of a laminate for a brake shoe. The brake shoe body 11' for the brake shoe has a circular arc-shape with two ends nearly facing each other, and has a pair of parallel shoe ribs 112' extending from both side edges of the shoe rim 111' radially inwardly relative to the circular arc-shape. Each end 113' of the shoe rim 111' is folded double radially inwardly relative to the circular arc-shape to form an M-shape together with the shoe ribs 112'. Although two friction linings 12' are laminated on the radially outer face of the shoe rim 111' with the adhesive 13' interposed between each friction lining 12' and the shoe rim 111', the number and shape of the friction linings 12' may be altered depending on the conditions of the following heating and pressing and on the apparatus therefor. If the side edges of the shoe rim 111' are rounded, the friction linings 12' are preferably laminated on only the flat area of the radially outer face of the shoe rim 111' as shown in FIG. 14.

Figure 14:
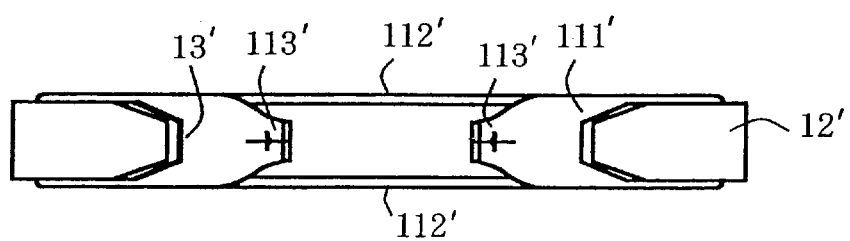
FIG. 14 is a top view of the laminate of FIG. 13.
Figure 15:
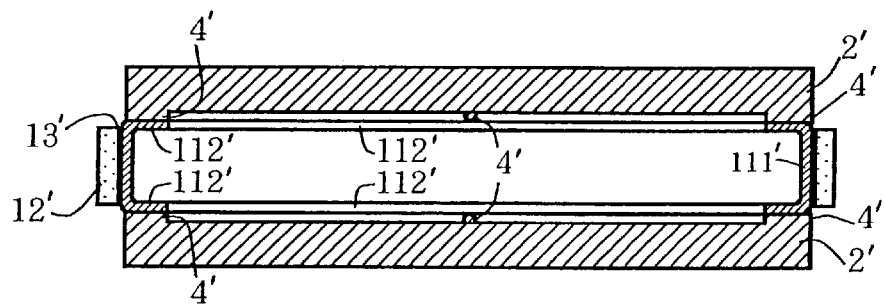
FIG. 15 is a cross-section illustrating the laminate of FIG. 13 being heated.

FIG. 15 is a cross-section illustrating the laminate of FIG. 14 being heated by a method of an embodiment according to the invention. A pair of radiation heaters 2' having respective flat faces are arranged so that the flat faces are close to the outer sides of the shoe ribs 112' of the brake shoe body 11' respectively, to heat the brake shoe body 11' with radiant heat. Plural projections 4' on the flat faces of the radiation heater 2' are in contact with the outer sides of the shoe ribs 112' to support the laminate 1'. While the laminate 1' is being heated in such a manner, the friction linings 12' are pressed to the brake shoe body 11' to bond them.

Hereinafter, the procedure of bonding a laminate with heat and pressure using the apparatus of FIGS. 1 and 2 will be described. First a thermosetting adhesive is applied to the radially outer face of the shoe rim 111 of the brake shoe body 11 and to the radially inner face of the friction lining 12, and then dried in a hot-blast furnace. The shoe rim 111 and the friction lining 12 are then laminated with the dried thermosetting adhesive interposed therebetween, to prepare the laminate 1.

Subsequently, as the white arrow indicates in FIG. 1, the shoe rib 112 of the brake shoe body 11 of the laminate 1 is inserted in the narrow groove 222 of the laminate holder 22 so that it does not contact the walls of the narrow groove 222. Plural projections 4, which construct a shoe rim supporter, on the bent face 221 of the laminate holder 22 come in line-contact with the radially inner face of the shoe rim 111, to support the laminate 1. The pressing unit 3 descends in the direction of the white arrow to approach the laminate 1, and the pressing band 31 comes in contact with the surface of the friction lining 12 and presses the laminate 1. At the time, the shoe rim 111 and the friction lining 12 are pressed and bonded to each other with the adhesive 13 by the pressing band 31 uniformly in the whole bonding interface. The pressure is generally 7 kg/cm$^2$ or more, preferably 7 to 30 kg/cm$^2$. The heating temperature depends on the kind of the adhesive, and the preferred temperature is generally such that the shoe rim 111 and the shoe rib 112 are heated by radiant heat to 220 to 300° C. for 2 to 5 minutes. The time of heating and pressing depends on, for example, the temperature of the laminate holder 22, the material of the brake shoe body 11, the kind of the adhesive and the gaps separating the laminate holder 22 from the radially inner face of the shoe rim 111 and the sides of the shoe rib 112. When the brake shoe body 11 is formed of SPC steel, the shoe rim 111 is 1.4 to 2.6 mm thick, the shoe rib 112 is 3.2 to 4.5 mm thick, the gaps separating the laminate holder 22 from the radially inner face of the shoe rim 111 and the sides of the shoe rib 112 are 0.1 to 0.4 mm, and the temperature of the laminate holder 22 is 220 to 300° C., generally, the friction lining 12 can be bonded strongly to the shoe rim 111 by heating and pressing for 2 to 5 minutes.

After bonding, the pressing unit 3 ascends and moves away from the laminate 1 in the opposite direction to the arrow, to stop applying pressure to the laminate 1.

EXAMPLE 1

Brake shoe bodies formed of SPC steel (thickness of shoe rim: 1.6 mm, thickness of shoe rib: 3.2 mm) and friction linings were bonded respectively by using the apparatus as shown in FIG. 1. The friction linings used are an asbestos lining, which was produced by curing a mixture of asbestos fiber, a phenolic resin binder, a lubricant and a friction controlling agent with pressure and heat, and a non-asbestos lining, which was produced by curing a mixture of glass fiber, organic fiber, a phenolic resin binder, a lubricant and a friction controlling agent with pressure and heat. CEMEDINE CS2711 (trade name, nitrile-modified phenolic resin produced by Cemedine Co., Ltd.) was used as an adhesive. The laminate holder used was formed of aluminum and coated black. The bent face of the laminate holder was heated to 270° C., and a laminate produced by laminating the brake shoe body and the friction lining with the adhesive interposed therebetween was mounted on the laminate holder (the gap between the bent face of the laminate holder and the radially inner face of the shoe rim, namely the height of the projections: 0.2 mm; the gap between the side walls of the narrow groove and the sides of the shoe rib: 0.4 mm), and was heated and pressed for 3.5 minutes at a pressure of 20 kg/cm$^2$. The temperature of the brake shoe body rose to 260° C. for two minutes after the beginning of pressing and heating, and was then almost uniform at 260° C. By measurements of the bonding strength between the friction linings and the brake shoe bodies in the product brake shoe assemblies, both the asbestos lining and the non-asbestos lining were found bonded strongly with a shear strength of 16.8 kN.

INDUSTRIAL APPLICABILITY

By using the thermal bonding method and apparatus of the invention, bonding with heat and pressure using adhesives, such as bonding shoe rim of brake shoe body and friction lining, can be performed speedily with good heating efficiency, and plural bonded products can be produced continuously by using simple equipment. Further, since heating is not performed by heat conduction from a heater but by radiant heat emitted from a heater, any coating on coated laminates is not peeled off nor transfer to the heater. Accordingly, the method and apparatus of the invention are particularly suitable for bonding coated members with adhesives by heating and pressing.

What is claimed is:

1. A thermal bonding method for bonding at least two members to each other with an adhesive by pressing and heating a laminate formed by laminating the members on each other with the adhesive interposed therebetween, comprising:

placing at least one member of the laminate close to a heated radiant heater, and pressing the laminate, in a state where radiant heat is applied to portions of the at least two members being bonded, wherein the radiant heater comprises a heater element and a laminate holder which is in contact with the heater element, with heat transferred from the heater element to the laminate holder by heat conduction, the laminate holder emitting radiant heat to the laminate, the laminate holder coming in point-contact or line-contact with the at least one member of the laminate so that the laminate is supported by the laminate holder and is pressed in the radiant heat-applied state, wherein one member of the laminate is a brake shoe body, which comprises a shoe rim of an arcuate band form bent lengthwise and a shoe rib protruding radially inwardly from a radially inner face of the shoe rim, another member of the laminate is a friction lining laminated on a radially outer face of the shoe rim of the brake shoe body with the adhesive interposed therebetween, and wherein the brake shoe body is placed close to the radiant heater.

2. The method of claim 1, wherein plural laminates are bonded simultaneously using plural laminate holders by supporting each laminate by a respective laminate holder with at least one member of the laminate placed close to and partially in contact with the laminate holder, and the laminate being pressed in the radiant heat-applied state.

3. The method of claim 1, wherein at least one member of the laminate is heated to 220 to 300° C. with the radiant heat, and the laminate is pressed at a pressure of 7 kg/cm² or more.

4. The method of claim 1, wherein the brake shoe body comprises a shoe rim of an arcuate band form bent lengthwise and a shoe rib, which protrudes radially inwardly from a radially inner face of the shoe rim and extends in a direction of the length of the shoe rim along center of the width of the shoe rim.

5. The method of claim 1, wherein the brake shoe body is coated with a primer.

6. The method of claim 1, wherein the radiant heater has a black surface.

7. The method of claim 1, wherein the laminate holder has projections on the surface thereof, for the point-contact or line-contact with the at least one member of the laminate.

8. The method of claim 7, wherein the projections are of a size such that the at least one member of the laminate is spaced 0.1 to 0.4 mm from the surface of the laminate holder.

9. An apparatus for bonding at least two members to each other with an adhesive by pressing and heating a laminate formed by laminating the at least two members with the adhesive interposed therebetween, comprising a radiant heater, a supporting member for supporting the laminate so that at least one member of the at least two members is placed close to the radiant heater, and a pressing unit adapted to approach, contact and press the laminate supported by the supporting member and then move away from the laminate to stop applying pressure to the laminate, the radiant heater including a heater element and a laminate holder, the laminate holder being in contact with the heater element to transfer heat, from the heater element to the laminate holder, by heat conduction, the laminate holder emitting radiant heat for heating portions of the at least two members to be bonded, and having the supporting member and a face adapted to be close to the at least one member of the laminate, and the supporting member being formed on the face of the laminate holder so that when the at least one member is placed close to the face of the laminate holder the supporting member comes in point-contact or line-contact with the at least one member to support the laminate, wherein one member of the laminate is a brake shoe body, which comprises a shoe rim of an arcuate band form bent lengthwise and a shoe rib protruding radially inwardly from a radially inner face of the shoe rim, and another member of the laminate is a friction lining laminated on a radially outer face of the shoe of brake shoe body with the adhesive interposed therebetween, wherein the supporting member is adapted to support the laminate, with the brake shoe body placed close to the radiant heater, and wherein the pressing unit is adapted to approach and contact the surface of the friction lining of the laminate supported by the supporting member and press the laminate, and them move away from the laminate to stop applying pressure to the same.

10. The apparatus of claim 9, wherein the radiant heater comprises the heater and plural laminate holders contacting the heater, and the pressing unit is adapted to press plural laminates supported by the laminate holders simultaneously.

11. The apparatus of claim 9, wherein the brake shoe body comprises a shoe rim of an arcuate band form bent lengthwise and a shoe rib, which protrudes radially inwardly from a radially inner face of the shoe rim and extends in a direction of the length of the shoe rim along center of the width of the shoe rim.

12. The apparatus of claim 11, wherein the pressing unit has a pressing band having a bent face capable of fitting with the surface of the friction lining of the laminate, and a pressing band holder which supports the pressing band.

13. The apparatus of claim 11, wherein the radiation heater comprises a heater and a laminate holder contacting the heater to conduct heat from the heater and emit radiant heat and having the supporting member and a face capable of being close to the brake shoe body of the laminate, and wherein the supporting member is formed on the face of the laminate holder so that when the at least one member is placed close to the face of the laminate holder, the supporting member comes partially in contact with the brake shoe body to support the laminate.

14. The apparatus of claim 13, wherein the laminate holder has a bent face and a narrow groove, the bent face being capable of fitting with the radially inner face of the shoe rim and having a radius larger than a radius of the radially inner face of the shoe rim, the narrow groove being for receiving the shoe rib without contacting the shoe rib, and wherein the bent face works as the supporting member at a part where the bent face contacts the shoe rim when the laminate is supported by the laminate holder, with the radially inner face of the shoe rim is placed close to the bent face of the laminate holder, and with the shoe rim received in the narrow groove.

15. The apparatus of claim 9, where the face is black.

16. The apparatus of claim 9, wherein the supporting member is projections extending from the face of the laminate holder, for the point-contact or line-contact with the at least one member of the laminate.

17. The apparatus of claim 16, wherein the projections are of a size such that the at least one member of the laminate is spaced 0.1 to 0.4 mm from the surface of the laminate holder.

18. An apparatus for bonding at least two members to each other with an adhesive by pressing and heating a laminate formed by laminating the two members with the adhesive interposed therebetween, comprising a radiant heater, a supporting member for supporting the laminate so that at least one member of the at least two members is placed close to the radiant heater, and a pressing unit adapted to approach, contact and press the laminate supported by the supporting member and then move away from the laminate to stop applying pressure to the laminate, the radiant heater including a heater element and a laminate holder, the laminate holder being in contact with the heater element to transfer heat, from the heater element to the laminate holder, by heat conduction, the laminate holder emitting radiant heat and having the supporting member and a face adapted to be close to the at least one member of the laminate, and the supporting member being formed on the face of the laminate holder so that when the at least one member is placed close to the face of the laminate holder such that the supporting member comes in point-contact or line-contact with the at least one member to support the laminate, wherein one member of the laminate is a brake shoe body which comprises a shoe rim of an arcuate band form bent lengthwise and a shoe rib protruding radially inwardly from a radially inner face of the shoe rim, and another member of the laminate is a friction lining laminated on a radially outer face of the shoe rim of the brake shoe body with the adhesive interposed therebetween;

wherein the supporting member is adapted to support the laminate, with the brake shoe body placed close to the radiant heater;

wherein the pressing unit is adapted to approach and contact the surface of the friction lining of the laminate supported by the supporting member and press the laminate, and them move away from the laminate to stop applying pressure to the same;

wherein the brake shoe body comprises a shoe rim of an arcuate band form bent lengthwise and a shoe rib, which protrudes radially inwardly from a radially inner face of the shoe rim and extends in a direction of the length of the shoe rim along a center of the width of the shoe rim;

wherein the radiation heater comprises a heater and a laminate holder contacting the heater to conduct heat from the heater and emit radiant heat and having the supporting member and a face capable of being close to the brake shoe body of the laminate;

wherein the supporting member is formed on the face of the laminate holder so that when the at least one member is placed close to the face of the laminate holder, the supporting member comes partially in contact with the brake shoe body to support the laminate;

wherein the laminate holder has a bent face and a narrow groove, the bent face being capable of fitting with the radially inner face of the shoe rim, the narrow groove being for receiving the shoe rib without contacting the shoe rib; and wherein the supporting member is a shoe rim supporter comprising at least one projection formed on the bent face of the laminate holder.

19. The apparatus of claim 18, wherein the surface of the projection on the bent face is coated with a releasable heat resistant polymer.

20. The apparatus of claim 18, wherein a pin is inserted in a hole made in the laminate holder so that a part of the pin protrudes from the bent face to form the projection.

* * * * *